United States Patent [19]

Kracklauer

[11] 3,926,881

[45] Dec. 16, 1975

[54] FLEXIBLE POLYVINYL CHLORIDE PLASTICS HAVING IMPROVED FLAME RETARDANCY AND REDUCED SMOKE GENERATING

[75] Inventor: John J. Kracklauer, Boulder, Colo.

[73] Assignee: Syntex (U.S.A.) Inc., Palo Alto, Calif.

[22] Filed: May 6, 1974

[21] Appl. No.: 467,534

[52] U.S. Cl.................... 260/28.5 D; 260/45.75 P
[51] Int. Cl.² ........................................ C08L 91/00
[58] Field of Search ............... 260/28.5 D, 45.75 P

[56] References Cited
UNITED STATES PATENTS
3,321,416  5/1967  Rauschenbach et al. ...... 260/45.7 R FOREIGN PATENTS OR APPLICATIONS
1,049,333  11/1966  United Kingdom............. 260/45.75

Primary Examiner—M. J. Welsh
Attorney, Agent, or Firm—Lawrence S. Squires; William B. Walker

[57] ABSTRACT

Flexible polyvinyl chloride having improved flame retardancy and reduced smoke generating properties. The plastics are characterized in that they contain about from 0.1 to 1 part, by wt., of a high molecular weight ferrocene derivative and about 5 to 30 parts, by wt., of chlorinated paraffin per 100 parts of polyvinyl chloride resin.

11 Claims, No Drawings

३,९२६,८८१

FLEXIBLE POLYVINYL CHLORIDE PLASTICS HAVING IMPROVED FLAME RETARDANCY AND REDUCED SMOKE GENERATING

BACKGROUND OF THE INVENTION

1. Field of the Invention

This invention relates to flexible polyvinyl chloride plastics having improved flame retardancy and improved smoke suppression properties and to methods of preparing such plastics.

2. The Prior Art

Two of the major safety problems incident to polyvinyl chloride plastic systems, or other plastic systems, are flammability and smoke generation. Accordingly, many additives and combinations of additives have been added and proposed by the prior art in an attempt to reduce one or the other of these safety problems. Note, for example, U.S. Pat. Nos. 2,894,918; 3,513,119; 3,639,302; 3,676,376 and British Patent 1,049,333. A major problem with these prior art solutions is that typically a system or additive which reduces one of these problems, for instance, i.e. flammability or smoke reduction, inherently causes an increase in the other. Thus, for example, the addition of additives such as animony oxide ($Sb_2O_3$) or tricresyl phosphate to certain plastics produce a dramatic reduction in flammability but cause an increase in the amount of smoke generated by the plastic. The use of the combination of ferrocene and chlorinated paraffins in styrene polymers, poly-$\alpha$-methylstyrene, or co-polymers of $\alpha$-methylstyrene, and styrene, to improve flame retardancy is taught by U.S. Pat. Nos. 3,269,963 and 3,321,416. However, a further difficulty is the empirical nature of the problem, thus until a given additive or combination of additives have been used with respect to a given plastic, it is virtually impossible to predict with any certainty the combined affect on flame retardancy or smoke suppression which will be obtained. In my previous application, U.S. Ser. No. 227,254, filed Feb. 17, 1972, and now abandoned I discovered that by the use of ferrocene (i.e. dicyclopentadienyl iron), or ferrocene derivatives as additives that a very substantial reduction in smoke production can be obtained in polyvinyl chloride plastics. I have now further discovered that by the use of the combination of high molecular weight, ferrocene derivatives and chlorinated paraffins, that I am able to obtain a substantial increase in smoke reduction and also a substantial increase in flame retardancy, and in fact I am able to obtain a syngergistic increase in flame retardancy over that of a pure chlorinated additive polyvinyl chloride system with only a very minimum increase in smoke generation over the corresponding polyvinyl chloride system, containing only the ferrocene addition.

SUMMARY OF THE INVENTION

In summary, the compositions of my invention comprise a polyvinyl chloride plastic system containing a ferrocene derivative having a molecular weight at least 360, and a chlorinated paraffin, having improved flame retardancy and smoke suppression properties.

The invention will be further described herein below.

DETAILED DESCRIPTION OF THE INVENTION AND PREFERRED EMBODIMENTS

Considering the invention in detail, the flexible polyvinyl chloride compositions, of the invention, comprise, per 100 parts, by wt., of polyvinyl chloride resin, about from 0.01 to 1 part, by wt., preferably about from 0.05 to 0.5 parts, by wt., of a ferrocene derivative having a molecular weight of at least 360, or at least mixtures of such ferrocene derivatives, and about from 5 to 30 parts, by wt., preferably about from 7 to 20 parts, by wt., of a suitable chlorinated paraffin. The quantity of the ferrocene derivative is critical since if quantities of the ferrocene derivative in excess of the prescribed range are used, the ferrocene derivative will function as an oxidation catalyst thus increasing the flammability of the plastic and quantities of the ferrocene derivative below the prescribed range would be ineffective. In each instance the additive is present in the polyvinyl plastic as a physical mixture — i.e. chemically uncombined with the polyvinyl chloride polymer. The chlorinated paraffins which are useful in the practice of the invention have a chlorine content about from 35 to 75%, by wt., and preferably about from 55 to 65%, by wt., and preferably should be liquid at room temperature and preferably have a room temperature (i.e. 20°C) viscosity in the range of about from 1 to 200 poise. Typically, the chlorinated paraffin can be conveniently obtained commercially as a mixture containing two or more chlorinated paraffins having from 18 to 40 carbon atoms in the molecule and having the prescribed degree of chlorination. Further since the chlorinated paraffin also functions as a plasticizer, it is preferable to reduce the quantity of plasticizer otherwise used in the flexible polyvinyl chloride plastic to compensate for the addition of the chlorinated paraffin. Typically, the plasticizer is reduced by about one part for every two parts of chlorinated paraffin.

Because of the volatility of ferrocene and its lower molecular weight derivatives, I have found that such additives, although quite suitable for use in rigid polyvinyl chloride, to be unsuitable for prolonged use in flexible polyvinyl since over a prolonged period they will diffuse out of the plastic and will be lost to the atmosphere by evaporation. Suitable ferrocene derivatives, which can be used in the invention, are those having a molecular weight of at least 360 and include both simple high molecular weight ferrocene derivatives such as, for example, monoalkyl and dialkyl substituted ferrocenes, for example, butyldecyl ferrocene, hexadecyl ferrocene, bis-(heptylcyclopentadienyl)-iron, monoalkanoyl and dialkanoyl substituted ferrocenes, for example, lauroyl ferrocene, and also dimers and polymers such as, for example, vinyl ferrocene copolymers with vinyl chloride or acrylic acid methyl methacrylate, or butadiene (see U.S. Pat. No. 3,770,787) or cyclopentane (see U.S. Patent 3,350,369); ferrocene condensation dimers and polymers with aldehydes and ketones; ferrocene addition products with polyvinyl chloride and polyvinylidene chloride; and the like. The high molecular weight ferrocene derivatives are known compounds and can be prepared according to known procedures such as, for example, described in J.A.C.S., 74, 3458 (1952), U.S. Pat. Nos. 3,238,185, 3,341,495, 3,350,369, 3,437,634, 3,673,232, 3,770,787 or by obvious modifications of such procedures. For example, U.S. Pat. No. 3,238,185 discloses ferrocene polymers consisting of the following type

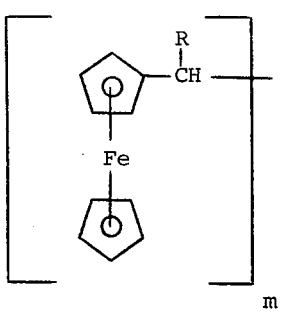

wherein m is an integer of from two up to high values, e.g. 50; R is hydrogen, low molecular weight alkyl groups or aryl or alkylaryl, e.g. phenyl, methyl, phenyl, alkylphenyl, etc. The cyclopentadienyl rings of the ferrocenyl group may be substituted by alkyl groups, aryl, aralkyl, alkaryl, or halogen. One or more of such groups may be present as substituents on one or both of the cyclopentadienyl rings.

U.S. Pat. No. 3,341,495 describes polymers having a repeating unit of the novolac type as follows

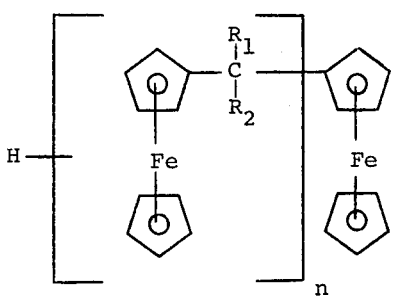

wherein $R_1$ and $R_2$ are independently hydrogen, alkyl, aryl, such as phenyl, or aralkyl such as benzyl phenylethyl, etc. The cyclopentadienyl rings may be substituted, e.g. by low molecular weight alkyl groups (e.g. methyl, ethyl, etc.) or aryl groups (e.g. phenyl) or aralkyl groups (e.g. benzyl and phenylethyl); also by halogens, nitro or amino groups.

U.S. Pat. No. 3,673,232 discloses dimeric dicyclopentadienyl iron polymers of the formula

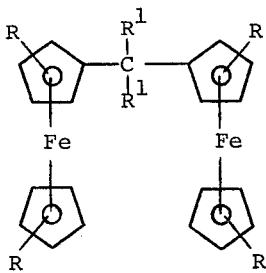

wherein each R independently is hydrogen, halo, alkyl, cycloalkyl, aryl, or heterocyclic and each $R^1$ independently is alkyl, aryl or aralkyl.

U.S. Pat. No. 3,437,634 discloses polymers having the formulas

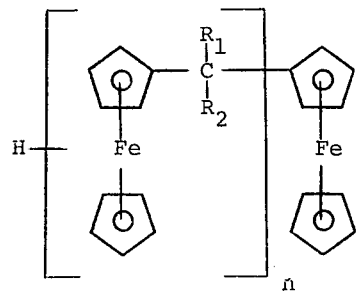 and 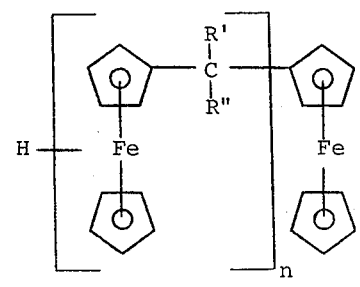

wherein n is a positive integer, $R_1$ and $R_2$ are independently hydrogen, alkyl, aryl or arylalkyl; $R'$ is an organic radical selected from the group consisting of aliphatic, cycloaliphatic, aromatic and heterocyclic radicals, said radical comprising a reactive group selected from the class consisting of carboxyl, hydroxyl, cyano, alkoxy, amino, halogen, and olefinically unsaturated groups; $R''$ is a member selected from the group consisting of hydrogen and an organic radical selected from the group consisting of aliphatic, cycloaliphatic, aromatic and heterocyclic groups; and wherein the cyclopentadienyl moieties can be substituted with low molecular weight alkyls, aryls, aralkyls, halogen, nitro or amino groups. I have further found that particularly good results are obtained by using 2,2-diferrocenylpropane polymers, especially so those prepared according to the procedure described by T. Rutledge, in U.S. Application Ser. No. 467,533, filed on even date herewith and described herein below in Preparation 1.

The ferrocene derivative and chlorinated paraffin can be added to the polyvinyl chloride polymer, either individually or as a mixture. Conveniently the ferrocene derivative and chlorinated paraffin are pre-blended in the proper ratios, and stored or shipped as pre-mix solution of the ferrocene derivative in the chlorinated paraffin which can then be added to the polyvinyl chloride plastic when needed. The ferrocene derivative and chlorinated paraffin can be mixed or blended with the polyvinyl chloride plastic by any suitable procedure such as, for example, milling, rolling, kneading, extruding, and the like. The additives can also be conveniently added either individually or as a blend directly to the polyvinyl chloride monomers prior to polymerization.

The flame retardant, low smoke, flexible polyvinyl chloride compositions of the invention otherwise have essentially the same properties as the corresponding untreated flexible polyvinyl chloride and hence can be used for the same kind of products, e.g. automobile and airplane parts, containers, applicances, electrical devices, furniture, etc., and are particularly desirable in applications where the risk of fire or smoke toxicity is particularly prevalent such as, for example, in buildings, mass-transit vehicle parts, furniture, and electrical insulation (coatings) and devices.

DEFINITIONS

As used herein above and below the following terms have the following meanings unless expressly stated to the contrary. The term plastic refers to a material that contains, as an essential ingredient, an organic substance of large molecular weight, is solid in its finished state and, at some stage in its manufacture, or in its processing, as finished articles, can be shaped by flow (definition from ASTM, D883–541). The term plastic and resin (q.v.) are used in overlapping senses but resin applies more specifically to the more or less chemically homogeneous polymer used as starting materials in the production molded articles while plastic signifies the final solid product, which may contain fillers, plasticizers, stabilizers, pigments, or other additives. Note, *Condensed Chemical Dictionary*, Seventh Edition, Reinhold Publishing Corporation, pages 751-2.

The term polyvinyl chloride plastics, or polyvinyl chloride resins, refers to such plastics or resins containing a vinyl chloride homopolymer or copolymers containing a minimum of about 50% vinyl chloride polymerized in accordance with known methods whether anionic, catonic, free radical, or singularly induced, or the like.

The term flexible polyvinyl chloride refers to polyvinyl chloride plastics or resins containing at least 10 parts per wt. of one or more plasticizers per 100 parts of the polyvinyl chloride polymer; typically about from 30 to 80 pph. Typical plasticizers include, for example, dioctyl phthalate, tricresylphosphate, diisodecyl phthalate, and the like.

The term "parts" or "pts." refers to parts by weight. The term pph means parts per hundred parts.

The dicyclopentadienyl iron polymers have their polymer linkages via (between) the cyclopentadienyl moieties. For example, the term 2,2-di-(dicyclopentadienyl iron)-propane polymer refers to polymers having the general formula:

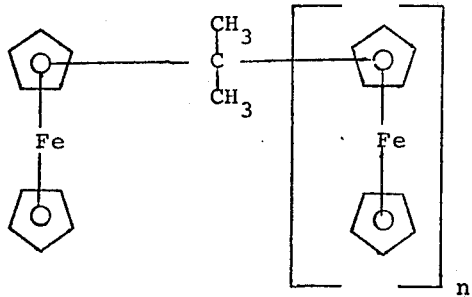

wherein $n$ = a whole integer of from one to 10 and the polymer is a $\Sigma$ of $n = 1$ to $n = 7$ polymers.

A further understanding of the invention can be had from the following non-limiting examples.

PREPARATION 1

This preparation illustrates the preparation of 2,2-diferrocenylpropane iron polymer according to the procedure described by T. Rutledge in U.S. Application Ser. No. 467,533, filed on even date herewith. In this preparation 125 ml. of xylene is added to a stirred solution containing 87.5 g. of 115% phosphoric acid in 50 ml. of methanol at 40°C. 37.5 Grams (0.2 moles) of dicyclopentadienyl iron is then added yielding a two phase liquid mixture. The mixture is then heated to 115°C and a liquid mixture containing 23.2 g. (0.4 moles) of acetone and 43 ml. of xylene is slowly added dropwise over a period of three hours. The resulting mixture is then maintained between 105° and 125°C. The mixture is then periodically sampled and examined by thin-layer chromatography for dicyclopentadienyl iron. When the thin-layer chromatography analysis shows that at least 98% of the original dicyclopentadienyl iron starting material has been consumed (about 10 hours). The reaction mixture is then quenched by the addition of 82.5 ml. of water. The mixture is allowed to phase out and the aqueous phase is then decanted off. The decanted aqueous phase is extracted with 50 ml. of xylene and the resulting extract combined with the remaining organic layers of the original reaction mixture. The combined mixture is filtered through a filter pre-coated with sodium bicarbonate (to destroy residual traces of phosphoric acid). The resulting filtrate is distilled to remove the xylene solvent affording a 2,2-di-(dicyclopentadienyl iron)-propane polymer having an iron content of from 20.5 to 22.5%, by wt., as a viscous liquid. The 2,2-di-(dicyclopentadienyl iron)-propane polymer is used in Examples 1 and 2, herein below under the trivial name 2,2-diferrocenyl-propane polymer.

EXAMPLE 1

This example illustrates the improved flame retardancy (self-extinguishing) and reduced smoke generating properties of the flexible polyvinyl chloride plastic compositions of the invention. In this example various compositions are prepared using various chlorinated paraffin compositions and 2,2-di-(dicyclopentadienyl iron)-propane polymer prepared according to Preparation 1. Control samples are also prepared representing the untreated flexible polyvinyl chloride plastic and also flexible polyvinyl chloride plastics that have only been treated with the respective chlorinated paraffins or the ferrocene derivatives. The basic control flexible polyvinyl chloride plastic formulation contains 100 parts polyvinyl chloride resin; 50 parts diisodecyl phthalate (plasticizer); and 5 parts of a silico-chromate-lead thermal stabilizer (sold under the trademark Tribase XL by National Lead Corporation).

The samples are prepared by pre-blending all of the components of the sample except the polyvinyl resin and then adding the pre-blend to the polyvinyl resin powder. The resulting mixture is then stirred and poured into a compression mold and then contact compression molded for about two minutes at 175°C. The quantity of plasticizer is reduced in the chlorinated paraffin polyvinyl chloride plastics to compensate for the plasticizer affect of the chlorinated paraffins. The respective chlorinated paraffins are described in Table A below. The respective compositions are identically tested for flammability in accordance with the procedure described by ASTM D2863 for Oxygen Index (Note: higher Oxygen Index number indicate improved flame retardancy). The compositions are identically tested for % smoke and % char using an Arapahoe smoke chamber consisting of a cylindrical combustion chamber 5 inches in diameter mounted vertically with an ignition orifice at its lower edge measuring 2.5 inches wide and 2.25 inches high. The sample (1½ inches × ½ inch × ⅛ inch in size) is supported horizontally 1¾ inches from the bottom. The flame source is a micro-Bunsen burner fired with 60 cc. per minute of propane (1.67 BTU per min. heat flux). It is positioned so that the tip of the inner blue cone impinges the lower edge of the sample at a 210° angle. The combustion chamber is fitted with a 3 inches diameter by 24 inches high chimney to cool the combustion gases. These gases and entrained smoke then impinge on a filter paper which covers the orifice of a high-capacity vacuum source. The velocity at the ignition orifice is 180 ft./min., in the chamber it is 50 ft./min., and in the chimney it is 145 ft./min. This is sufficient to entrain all the smoke produced during combustion and provides efficient collection on the filter paper.

PROCEDURE

The flame exposure for all tests is 30 seconds with the vacuum source turned on five seconds before the flame exposure and turned off five seconds after the flame is removed (and sample extinguished if necessary).

DATA REDUCTION

The sample is weighed before and after flame exposure and the loss of volatile products recorded.

The filter paper is weighed before and after and smoke weight recorded.

The sample then is mechanically debrided of char, using a sand mill (inclined 45° from the horizontal and rotating at 60 rpm) and reweighed.

The amount involved in combustion is the net difference between the initial sample weight and final weight after char removal. Char weight is the difference between intermediate and final sample weight.

Smoke weight and char weight are then reduced to percentages by division by amount involved in combustion × 100.

In accordance with this test, a low smoke % index and a high char % index are desirable. The results of these tests are summarized in Table 1 below.

TABLE A

| Chloro-paraffin | Chlorine content | Viscosity (Poise at 25%) | Color (Gardner) | Specific Gravity | Sold by - under the Trademark |
|---|---|---|---|---|---|
| A | 59% | 20 | 1 | 1.35 | Diamond Shamrock Corp. Chlorowax 500C |
| B | 43% | 41 | 2 | 1.17 | Diamond Shamrock Corp. Chlorowax 40 |
| C | 48% | 171 | 2 | 1.23 | Diamond Shamrock Corp. Chlorowax 50 |
| D | 51% | 1 | 4 | 1.25 | Imperial Chemical Corp. Cereclor S-52 |
| E | 60% | 45 | 1 | 1.38 | Keil Corp. Keil 6000 |

For purpose of easier reading, Table 1 has been split into three tables. The basic formulation used for each sample contained 100 parts, by wt., of polyvinyl chloride resin, 5 parts, by wt., of lead chromate thermal stabilizer sold under the trademark Tribase XL by National Lead Inc., and from 35 to 50 parts, by wt., of diisodecyl phthalate plasticizer. The variation in the amount of plasticizer is to compensate for the plasticizing affect of the chloroparaffin. Accordingly, with the exception of the formulation variation (i.e. additives and plasticizer quantity) indicated in the tables, the sample formulations were identical.

TABLE 1a

| Component | Base | SAMPLE 1 | 2 | 3* |
|---|---|---|---|---|
|  | | Parts by Weight per 100 parts PVC Resin | | |
| Diisodecyl Phthalate | 50 | 50 | 41 | 41 |
| Chloroparaffin A | — | — | 18 | 18 |
| 2,2-diferrocenylpropane polymer | — | 0.15 | — | 0.15 |
| Flammability Oxygen Index | 26.5 | 27.9 | 27.8 | 29.5 |
| % Smoke | 10.3 | 6.8 | 10.5 | 7.0 |
| % Char | 11.0 | 14.4 | 11.2 | 15.6 |

TABLE 1b

| Component | SAMPLE 4 | 5* | 6 | 7* |
|---|---|---|---|---|
|  | Parts by Weight per 100 parts PVC Resin | | | |
| Diisodecyl Phthalate | 43 | 43 | 43 | 43 |
| Chloroparaffin B | 14 | 14 | — | — |
| 2,2-diferrocenylpropane polymer | — | 0.11 | — | 0.11 |

TABLE 1b-continued

| Component | SAMPLE 4 | 5* | 6 | 7* |
|---|---|---|---|---|
|  | Parts by Weight per 100 parts PVC Resin | | | |
| Chloroparaffin C | — | — | 14 | 14 |
| Flammability Oxygen Index | 26.6 | 28.1 | 26.8 | 28.7 |
| % Smoke | 10.8 | 8.6 | 10.3 | 7.9 |
| % Char | 10.2 | 11.7 | 10.1 | 13.7 |

TABLE 1c

| Component | SAMPLE 8 | 9* | 10 | 11* |
|---|---|---|---|---|
|  | Parts by Weight per 100 parts PVC Resin | | | |
| Diisodecyl Phthalate | 35 | 35 | 41 | 41 |
| Chloroparaffin D | 18 | 18 | — | — |
| 2,2-diferrocenylpropane polymer | — | .15 | — | .15 |
| Chloroparaffin E | — | — | 18 | 18 |
| Flammability Oxygen Index | 28.2 | 29.6 | 28.0 | 29.7 |
| % Smoke | 11.7 | 8.4 | 11.3 | 8.5 |
| % Char | 10.6 | 13.8 | 9.4 | 13.5 |

As can be seen from the above tables, in each instance, the results are significantly improved for the compositions of the invention (denoted by *) as versus the untreated compositions and the corresponding chloroparaffin treated compositions. Also flame retardancy is improved in all of the compositions of the invention as compared with the formulation containing only the high molecular weight ferrocene derivative with only a modest loss in the reduction of smoke generation and in most instances a loss in % char. Also as can be seen from this table, best results are obtained with the test composition containing the ferrocene derivative and chlorinated paraffin having a 59 wt. % chlorinated content.

EXAMPLE 2

This example further illustrates the improved flame retardancy (self-extinguishing) and reduced smoke generating properties of the flexible polyvinyl chloride plastics of the invention. In this example three test compositions were prepared using 2,2-diferrocenepropane-polymer as the ferrocene derivative and either the chlorinated paraffin identified in Example 1 as chloroparaffin E (60% chlorine) or a chlorinated paraffin having a chlorine content of 70%, wt.; a viscosity of 17 poise at 25°C, a Gardner Color Index of 1 (defined 1933 Gardner Color Standards — formerly ASTM D154) and a specific gravity of 1.46, sold by Keil Corporation under the trademark Keil 7000, herein after referred to as chloroparaffin F. The test samples are compared with control samples. The plastics are tested for % smoke as described in Example 1 and time of burning after ignition under identical conditions. This later test measures the self-extinguishing properties of the plastic and is performed by vertically supporting a 6 inches × ½ inch × ⅛ inch sample and sequentially igniting the sample for five 10 second ignitions with a ¾ inch bunsen burner flame. As soon as the sample extinguishes, the flame is reapplied until the five ignitions have been completed. The time of burning is the summation of the time of burning after each ignition. A plastic is considered suitable for most purposes if it has a time of burning of 15 seconds or less. The respective formulations and the results of these tests are summarized below in Table 2.

TABLE 2

| Formulation | Parts by Weight | | | | | |
|---|---|---|---|---|---|---|
| Polyvinyl chloride Resin | 100 | 100 | 100 | 100 | 100 | 100 |
| Dioctyl Phthalate | 50 | 50 | 40 | 45 | 40 | 41.5 |
| Tin Stabilizer | 2 | 2 | 2 | 2 | 2 | 2 |
| Chloroparaffin E | — | — | 20 | 10 | 20 | — |
| Chloroparaffin F | — | — | — | — | — | 17 |
| 2,2-diferrocenyl-propane polymer | — | 0.15 | — | 0.3 | 0.15 | .15 |
| % Smoke | 9.7 | 6.8 | 10.1 | 6.9 | 7.5 | * |
| Time of Burning after 50 sec. ignition - in sec. | 56 | 24 | 13 | 8 | 7 | 11 |

*Through an oversight, the test formulation containing the 70% chlorine chloroparaffin was not tested for smoke, and the reduction in time of burning was not as prominent as in the case of the 60% chlorine chloroparaffin samples.

As can be seen from the above table, although the use of 60% chlorine chloroparaffin alone, dramatically decreased the time of burning, it also increased the smoke generated whereas the further addition of the high molecular weight ferrocene derivative not only reduced the smoke generation but further reduced the time of burning very significantly from that obtained with the 60% chlorine chloroparaffin treated plastic.

EXAMPLE 3

This example further illustrates the improved flame retardancy of the flexible polyvinyl chloride plastics of the invention containing other high molecular weight ferrocenyl derivatives. In this example test compositions are prepared identical to the test samples prepared in Example 1 but respectively using 2,2-bis-(ethylferrocenyl)-propane and monolauroyl ferrocene (i.e. $CH_3(CH_2)_{10}\overset{\overset{O}{\|}}{C}$-ferrocene)

in place of 2,2-diferrocenylpropane polymer and using the chloroparaffin identified in Table A (Example 1, page 12 hereof) as Chloroparaffin A. The samples are tested in the same manner as described in Example 1, and the results thereof are summarized in Tables 3a and 3b herein below.

TABLE 3a

| | Base | SAMPLE | | |
|---|---|---|---|---|
| Component | | 1 | 2 | 3* |
| | | Parts by Weight per 100 parts PVC Resin | | |
| Diisodecyl Phthalate | 50 | 50 | 41 | 41 |
| Chloroparaffin A | — | — | 18 | 18 |
| 2,2-bis-(ferrocenyl)-propane dimer | — | 0.17 | — | 0.17 |
| Flammability Oxygen Index | 26.5 | 28.1 | 27.8 | 29.4 |
| % Smoke | 10.3 | 7.8 | 10.5 | 8.4 |
| % Char | 11.0 | 14.6 | 11.2 | 14.2 |

TABLE 3b

| | Base | SAMPLE | | |
|---|---|---|---|---|
| Component | | 5 | 6 | 7* |
| | | Parts by Weight per 100 parts PVC Resin | | |
| Diisodecyl Phthalate | 50 | 50 | 41 | 41 |
| Chloroparaffin A | — | — | 18 | 18 |
| Monolauroylferrocene | — | 0.11 | — | 0.11 |
| Flammability Oxygen Index | 26.5 | 28.6 | 27.8 | 30.3 |
| % Smoke | 10.3 | 8.0 | 10.5 | 18.4 |
| % Char | 11.0 | 13.5 | 11.2 | 13.0 |

Obviously many modifications and variations of the invention, described herein above and below in the claims, can be made without departing from the essence and scope thereof.

What is claimed is:
1. A flexible polyvinyl chloride plastic having improved flame retardancy and smoke suppression properties, containing in chemically uncombined form, per 100 parts, by wt., of polyvinyl chloride resin, about from 5 to 30 parts of a chlorinated paraffin having a chlorine content of from 35 to 75%, by wt., and a viscosity, at 20°C, of about from 1 to 200 poise; and about from 0.01 to 1 part, by wt., of a dicyclopentadienyl iron derivative having a molecular weight of at least 360.
2. The composition of claim 1 wherein said plastic contains about from 7 to 20 parts, by wt., of said chlorinated paraffin, per 100 parts of said resin.
3. The composition of claim 1 wherein said plastic contains about from 0.05 to 0.5 parts, by wt., of said dicyclopentadienyl iron derivatives per 100 parts of said resin.
4. The composition of claim 3 wherein said plastic contains about from 7 to 20 parts, by wt., of said chlorinated paraffin.
5. The composition of claim 1 wherein said chlorinated paraffin is selected from the group having a chlorine content of about from 55 to 65% by wt.
6. A flexible polyvinyl chloride plastic having improved flame retardancy and smoke suppression properties, containing in chemically uncombined form, per 100 parts, by wt., of polyvinyl chloride resin, about from 5 to 30 parts of a chlorinated paraffin having a chlorine content of from 35 to 75%, by wt., and a viscosity, at 20°C, of about from 1 to 200 poise; and about from 0.01 to 1 part, by wt., of a dicyclopentadienyl iron derivative, having a molecular weight of at least 360, selected from the group consisting of monoalkyl and dialkyl substituted dicyclopentadienyl iron, monoalkanoyl and dialkanoyl substituted dicyclopentadienyl iron, and polymers of dicyclopentadienyl iron selected from the group consisting of copolymers of vinyl ferro- cene with vinyl chloride, acrylic acid methacrylates, butadiene or cyclopentane; and dicyclopentadienyl iron condensation polymers having the formula

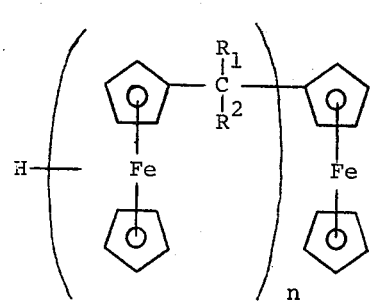 and 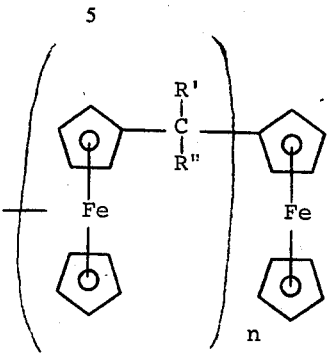

wherein $n$ is a positive integer, $R_1$ and $R_2$ are independently hydrogen, alkyl, aryl, or arylalkyl; $R'$ is an organic radical selected from the group consisting of aliphatic, cycloaliphatic, aromatic and heterocyclic radicals, said radical comprising a reactive group selected from the class consisting of carboxyl, hydroxyl, cyano, alkoxy, amino, halogen, and olefinically unsaturated groups; $R''$ is a member selected from the group consisting of hydrogen and an organic radical selected from the group consisting of aliphatic, cycloaliphatic, aromatic and heterocyclic groups; and wherein the cyclopentadienyl moieties can be substituted with low molecular weight alkyls, aryls, aralkyls, halogen, nitro or amino groups;
and mixtures of such ferrocene derivatives.

7. The composition of claim 6 wherein said dicyclopentadienyl iron derivative is selected from the group consisting of the polymers of 2,2-di-(dicyclopentadienyl iron)-propane and mixtures thereof.

8. The composition of claim 6 wherein said chlorinated paraffin is selected from the group of chlorinated paraffins having a chlorine content of about from 55 to 65%, by wt.

9. The composition of claim 7 wherein said chlorinated paraffin is selected from the group having a chlorine content of about from 55 to 65%, by wt.

10. The composition of claim 8 wherein said polyvinyl chloride plastic contains about from 0.05 to 5 parts, by wt., of said dicyclopentadienyl iron derivative and about from 7 to 20 parts, by wt., of said chlorinated paraffin per 100 parts of said polyvinyl chloride resin.

11. The composition of claim 6 wherein said condensation polymer is selected from the group of 2,2-di(-dicyclopentadienyl iron)-propane polymers and mixtures thereof.

* * * * *